(12) United States Patent
Haug et al.

(10) Patent No.: US 10,684,185 B2
(45) Date of Patent: Jun. 16, 2020

(54) SENSOR AND/OR SOUND DETECTION DEVICE AND MANUFACTURING METHOD FOR A SENSOR AND/OR SOUND DETECTION DEVICE

(71) Applicant: Robert Bosch GmbH, Stuttgart (DE)

(72) Inventors: Daniel Haug, Neuffen (DE); Holger Hoefer, Juelich (DE); Jochen Reinmuth, Reutlingen (DE); Michael Knauss, Pfullingen (DE); Sebastian Schuler-Watkins, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 203 days.

(21) Appl. No.: 16/016,131

(22) Filed: Jun. 22, 2018

(65) Prior Publication Data

US 2018/0372573 A1   Dec. 27, 2018

(30) Foreign Application Priority Data

Jun. 23, 2017 (DE) .......................... 10 2017 210 598

(51) Int. Cl.
*G01L 19/06* (2006.01)
*G01L 9/00* (2006.01)

(52) U.S. Cl.
CPC ........ *G01L 19/0645* (2013.01); *G01L 9/0041* (2013.01); *G01L 19/0654* (2013.01)

(58) Field of Classification Search
USPC .................................................. 73/700–756
See application file for complete search history.

(56) References Cited

U.S. PATENT DOCUMENTS

| | | | |
|---|---|---|---|
| 2013/0100779 A1* | 4/2013 | Lee .................. | H04R 31/00 367/188 |
| 2014/0010374 A1* | 1/2014 | Kasai ................. | H04R 19/016 381/26 |
| 2016/0023891 A1* | 1/2016 | Reinmuth ............ | G01L 19/143 257/416 |
| 2016/0076959 A1* | 3/2016 | Chen .................. | B81B 3/0072 73/723 |

(Continued)

FOREIGN PATENT DOCUMENTS

DE   102014214532 B3   10/2015

*Primary Examiner* — Andre J Allen
(74) *Attorney, Agent, or Firm* — Norton Rose Fulbright US LLP; Gerard Messina

(57) ABSTRACT

A sensor and/or sound detection device having a sensing device having a sensitive surface, an access channel being designed in such a way that air and/or a gas is transferable through the open access channel between a spatial surroundings of the sensor/detection device and the sensitive surface, and an at least partially water-impermeable membrane having respectively an inner side of the membrane facing the associated access channel being designed in such a way that a contact surface on the respective inner side of the respective membrane is pressed against an associated membrane contact surface on the associated access channel in such a way that the associated access channel is sealed in a liquid-tight manner when an outer side of the respective membrane or a covering layer on the respective outer side of the membrane is wetted with at least a minimum quantity of liquid and the respective membrane is deformed.

11 Claims, 10 Drawing Sheets

(56) References Cited

U.S. PATENT DOCUMENTS

| | | | | |
|---|---|---|---|---|
| 2016/0091384 A1* | 3/2016 | Muller | ............... | G01L 19/0069 |
| | | | | 73/715 |
| 2017/0190571 A1* | 7/2017 | Tsai | ..................... | B81C 1/0023 |
| 2019/0393007 A1* | 12/2019 | Klehr | ....................... | F17D 5/06 |

* cited by examiner

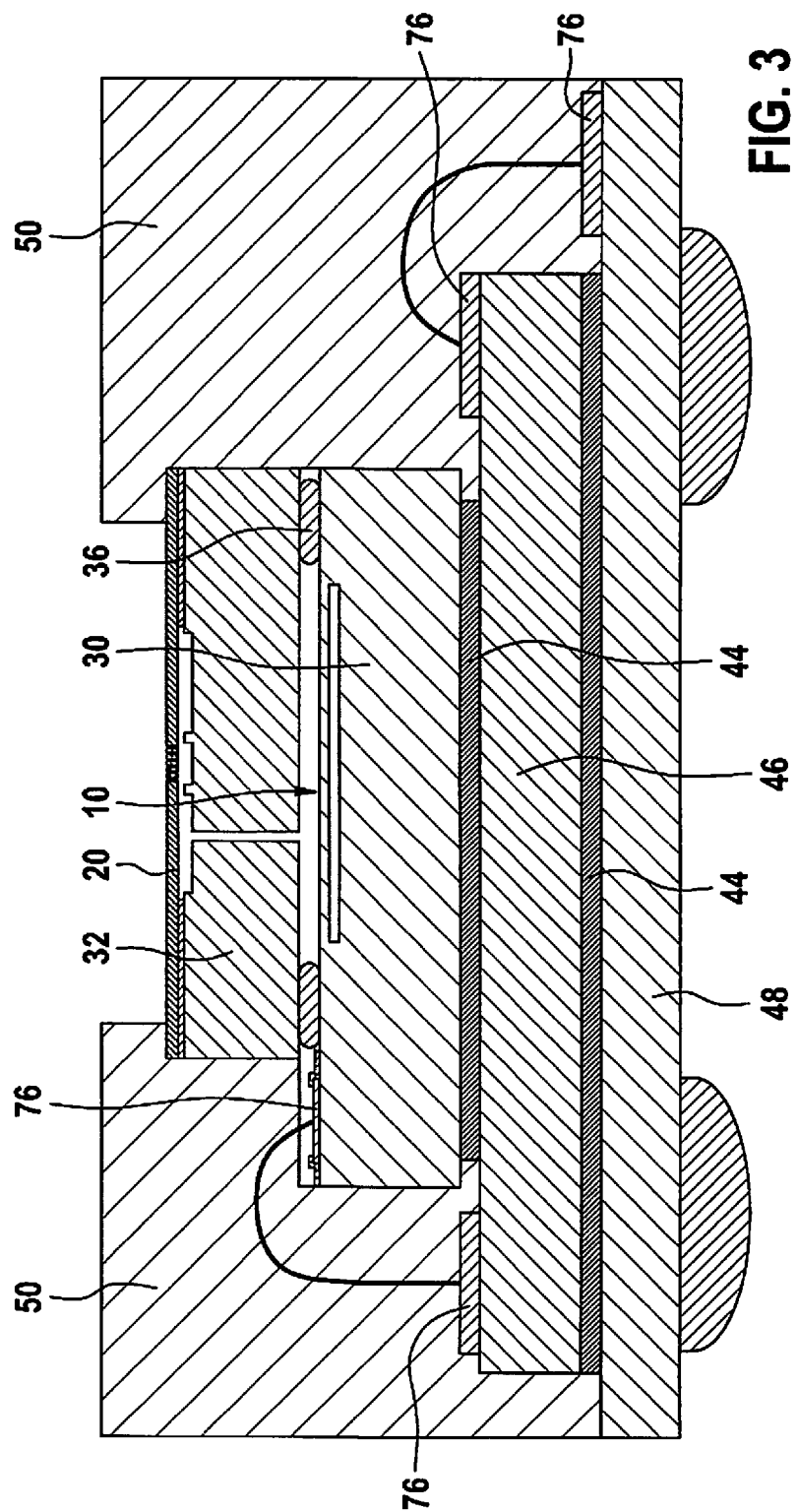

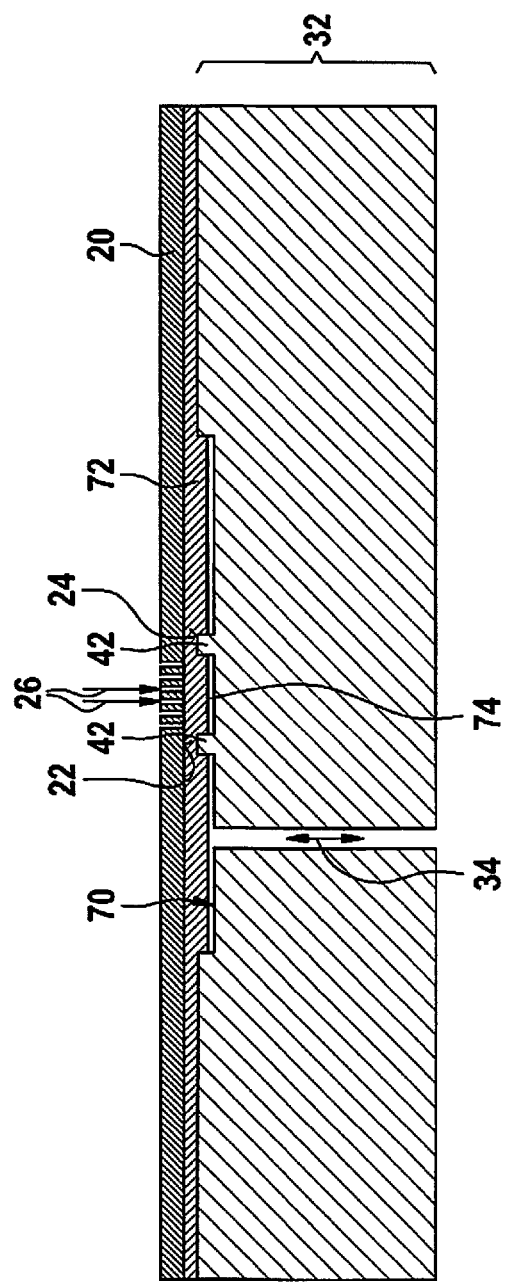

SENSOR AND/OR SOUND DETECTION DEVICE AND MANUFACTURING METHOD FOR A SENSOR AND/OR SOUND DETECTION DEVICE

CROSS REFERENCE

The present application claims the benefit under 35 U.S.C. § 119 of DE 102017210598.4 filed on Jun. 23, 2017, which is expressly incorporated herein by reference in its entirety.

FIELD

The present invention relates to a sensor and/or sound detection device. The present invention also relates to a manufacturing method for a sensor and/or sound detection device.

BACKGROUND INFORMATION

German Patent Application No. DE 10 2014 214 532 B3 describes a component having a MEMS element and a cap structure having a media connection opening. A pressure sensing surface is developed on the MEMS element, which is to be connected via the media connection opening to a spatial surroundings of the component in such a way that a pressure prevailing in the spatial surroundings also prevails on the pressure sensing surface. Furthermore, the pressure sensing surface is to be protected against foreign particles and interfering environmental influences by a special development of the media connection opening.

SUMMARY

The present invention provides a sensor and/or sound detection device and a manufacturing method for a sensor and/or sound detection device.

In accordance with the present invention, liquid-tight/water-tight sensor and/or sound detection devices are provided, in which, in spite of their design having the at least one access channel for ensuring a contact with their spatial surroundings and/or for ensuring an exchange of air and/or gas exchange with their spatial surroundings (for fulfilling their functions), an ingress of a liquid/water into the respective sensor and/or sound detection device through their at least one access channel is reliable prevented. The sensor and/or sound detection devices of the present invention are thus better protected from their environment than conventional sensors or sound detectors. In particular, the sensor and/or sound detection devices of the present invention are designed with a protective mechanism, which triggers a closure/sealing off of their at least one access channel whenever there is a danger of an ingress of liquid/water into the at least one access channel due to a contact of the respective membranes with liquid/water. The respective protective mechanism may be called a passive closing mechanism, which functions at any time without a liquid sensor, without a control system and without an actuator/motor. For this reason, the sensor and/or sound detection devices created by the present invention are comparatively cost-effective and relatively simple to manufacture.

It is noted explicitly that the sensor and/or sound detection devices created by the present invention are protected not only against "spray water," but are designed to be "genuinely" liquid-tight/"genuinely" water-tight. Normally, liquid/water is prevented from seeping through the at least one access channel of the respective sensor and/or sound detection device even when the sensor and/or sound detection devices of the present invention fall into a liquid/water.

In an advantageous specific embodiment of the sensor and/or sound detection device, the at least one membrane is designed in such a way that, if the respective outer side of the membrane or covering layer is unwetted, the respective membrane is in its initial position and the at least one associated access channel is kept open via at least one gap between the at least one contact surface of the respective membrane in its initial position and the at least one associated membrane contact surface on the at least one associated access channel. In this case, a wetting of the respective outer side of the membrane or covering layer may trigger a closure of the at least one gap, whereby the at least one associated access channel is sealed in a liquid-tight manner.

For example, it is possible for the at least one membrane to have at least one air and/or gas exchange opening extending from the respective inner side of the membrane to the respective outer side of the membrane. In this case, the at least one contact surface may rest on a water-impermeable sealing ring that is developed on the respective inner side of the membrane and that frames the respectively associated air and/or gas exchange opening. When the respective outer side of the membrane or covering layer is wetted with at least the minimum quantity of liquid, the at least one sealing ring may be pressed against the at least one associated membrane contact surface as the respective membrane is deformed. The specific embodiment of the sensor and/or sound detection device described here on the one hand ensures the desired transferability of air and/or the at least one gas through the at least one access channel when the respective outer side of the membrane or covering layer is unwetted and on the other hand ensures a reliable sealing of the at least one access channel when the respective outer side of the membrane or covering layer is wetted (with liquid/water).

Alternatively or additionally, the at least one membrane contact surface may also lie on at least one annular projection, against which the at least one associated contact surface, which frames its respectively associated air and/or gas exchange opening, is pressed when the respective outer side of the membrane or covering layer is wetted with at least the minimum quantity of liquid as the respective membrane is deformed. In this specific embodiment of the sensor and/or sound detection device as well, a reliable sealing of the at least one access channel is ensured when required.

In another advantageous specific embodiment of the sensor and/or sound detection device, the covering layer is permeable to air and/or the at least one gas and covers the at least one air and/or gas exchange opening of the associated membrane. Such a covering layer also prevents an ingress of liquid/water into the at least one access channel when the respective covering layer is "lightly" wetted with less than the minimum quantity of liquid.

Alternatively or additionally, the covering layer may also be water-repellent. This also contributes toward preventing the undesired ingress of liquid/water into the at least one access channel already when the covering layer is "lightly" wetted.

The sensing device is preferably developed on and/or in a sensor substrate, the at least one membrane being developed on an outer side of a cap substrate and spanning at least one outer-side edge region of at least one channel extending from the outer side to an inner side of the cap substrate facing away from the outer side, and the cap substrate being connected to the sensor substrate via an air-impermeable and water-impermeable connecting mass in such a way that at least one inner-side edge region of the at least one channel and the sensitive surface border on an intermediate volume enclosed by the cap substrate, the sensor substrate and the air-impermeable and water-impermeable connecting mass and that the at least one access channel runs at least through the intermediate volume and the at least one channel. As will be explained more precisely below, it is easy to manufacture such sensor and/or sound detection devices.

The sensor and/or sound detection device may be in particular a pressure sensor, a chemical detection sensor, a humidity sensor, a gas sensor and/or a microphone. The respective sensor and/or sound detection device is thus usable in a versatile manner such as for example in a mobile telephone. It should be noted, however, that the exemplary embodiments described here for the sensor and/or sound detection device are not to be interpreted conclusively.

Implementing a corresponding manufacturing method for a sensor and/or sound detection device also provides the previously described advantages. It is pointed out explicitly that the manufacturing method in accordance with the specific embodiments of the sensor and/or sound detection device explained above are capable of being developed further.

BRIEF DESCRIPTION OF THE DRAWINGS

Additional features and advantages of the present invention are explained below with reference to the figures.

FIG. 3 shows a schematic representation of a third specific example embodiment of the sensor and/or sound detection device.

FIGS. 5a through 5c show schematic representations for explaining a second example specific embodiment of the manufacturing method.

DETAILED DESCRIPTION OF EXAMPLE EMBODIMENTS

Figure 1:
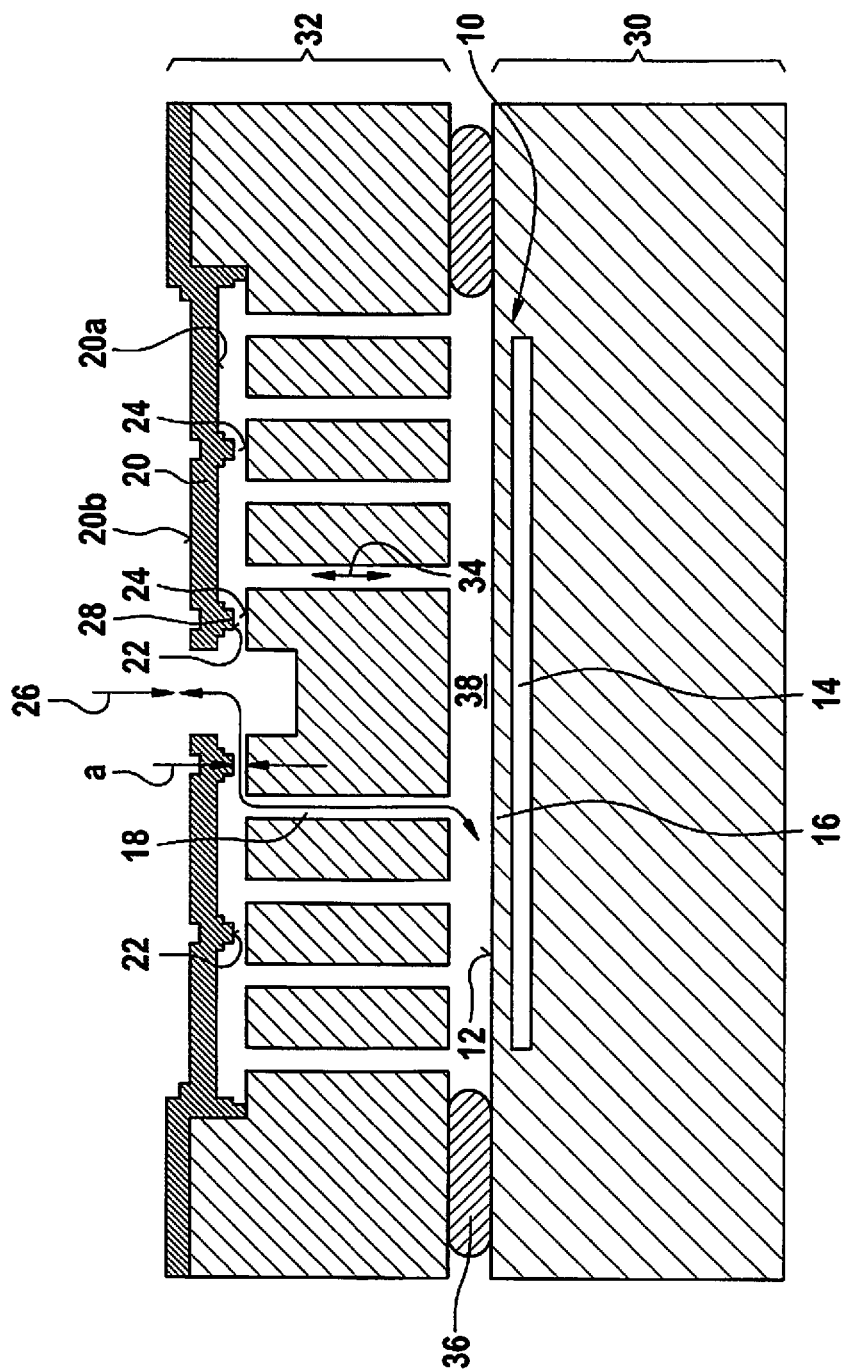
FIG. 1 shows a schematic representation of a first specific example embodiment of the sensor and/or sound detection device.

FIG. 1 shows a schematic representation of a first specific example embodiment of the sensor and/or sound detection device.

The sensor and/or sound detection device shown schematically in FIG. 1 has a sensing device 10 having a sensitive surface 12. The sensing device 10 is designed in such a way that a change in at least one physical variable and/or at least one chemical concentration on the sensitive surface 12 causes a change in a sensor signal output by sensing device 10 or tapped at sensing device 10. By way of example, in the specific embodiment of FIG. 1, sensing device 10 is developed (as a pressure-sensing or pressure-measuring device) with a reference cavity 14 (containing a reference pressure or vacuum) and a pressure-sensitive membrane 16 covering reference cavity 14, a change of a pressure on the sensitive surface 12 of pressure-sensitive membrane 16 facing away from reference cavity 14 (as the at least one physical variable) bringing about a bending in or bending out of pressure-sensitive membrane 16. The development of sensing device 10 shown in FIG. 1 is to be interpreted only in exemplary fashion, however.

At least one access channel 18 is developed in sensor and/or sound detection device in such a way that, at least as long as the at least one access channel 18 is open, air and/or at least one gas is transferable/is transferred through the at least one access channel 18 between a spatial surroundings of the sensor and/or sound detection device and the sensitive surface 12. The at least one access channel 18 may also be referred to as at least one media access. Furthermore, at least one at least partially water-impermeable membrane 20 having respectively an inner side 20a of the membrane facing the at least one associated access channel 18 is developed on and/or in the sensor and/or sound detection device. Wetting an outer side 20b of the respective membrane 20 (facing away from inner side 20a of the membrane) or a covering layer situated (directly or indirectly) on/above the respective outer side 20b of the membrane with at least a minimum quantity of liquid (of liquid/water) triggers a deformation of the respective membrane 20. In this manner, when the outer side 20b of the membrane or the covering layer is wetted with at least a minimum quantity of liquid, at least one contact surface/contacting surface 22 of the respective membrane 20 on the respective inner side 20a of the membrane is pressed against at least one associated membrane contact surface/membrane contacting surface 24 on the at least one associated access channel 18, as the respective membrane 20 is deformed. By way of a contact effected in this manner of the at least one contact surface 22 (on the respective inner side 20a of the membrane) with the at least one associated membrane contact surface 24 (on the at least one associated access channel 18) the at least one associated access channel 18 is sealed in a liquid-tight/water-tight manner.

The sensor and/or sound detection device shown schematically in FIG. 1 is thus liquid-tight/water-tight so that an ingress of liquid/water through the at least one access channel 18 into the sensor and/or sound detection device is prevented. Moreover, the protective mechanism of the present invention of the sensor and/or sound detection device, which makes the sensor and/or sound detection device liquid-tight/water-tight, is implemented merely by an appropriate design of the at least one membrane 20. The sensor and/or sound detection device is therefore comparatively cost-effective and relatively simple to manufacture.

FIG. 1 shows the at least one membrane 20 in its initial position, in which it exists at least when its respective outer side 20b or covering layer is unwetted (by liquid/water). (The specific embodiment of FIG. 1, by way of example, does without a covering layer lying (directly or indirectly) on/above the respective outer side 20b of the membrane.) When the at least one membrane 20 is in its initial position, the at least one associated access channel 18 is kept open via the at least one open gap (or a clearance a unequal to zero) between the at least one contact surface 22 (of respective membrane 20 in its initial position) and the at least one associated membrane contact surface 24 (on the at least one associated access channel 18). At least when the at least one membrane 20 is in its initial position, air and/or the at least one gas are thus able to flow unproblematically through the at least one open gap between the at least one contact surface 22 and the at least one associated membrane contact surface 24. The at least one gap between the at least one contact surface 22 (of the respective membrane 20 in its initial position) and the at least one associated membrane contact surface 24 (on the at least one associated access channel 18) is closed at the latest when the respective outer side 20b of the membrane (or covering layer) is wetted with the minimum quantity of liquid. At the latest when the respective outer side 20b of the membrane (or covering layer) is wetted with the minimum quantity of liquid, the contact of the at least one contact surface 22 with the at least one associated membrane contact surface 24 seals the respective access channel 18 in a liquid-tight/water-tight manner in such a way that no liquid/no water is able to penetrate through the respective access channel 18. The at least one contact surface 22 on the at least one inner side 20a of the membrane and the at least one associated membrane contact surface 24 on the at least one access channel 18 are therefore also referred to below as sealing surfaces 22 and 24. When the at least one gap is open (or the clearance a is unequal to zero) between sealing surfaces 22 and 24, one can speak of at least one open access channel 18, while the contact between sealing surfaces 22 and 24 ensures that the at least one access channel 18 is closed.

The at least one membrane 20 is preferably a silicon membrane/polysilicon membrane. The at least one membrane 20 is designed to be elastic/movable in such a way that by its deformation it reliable ensures the contact between sealing surfaces 22 and 24 and thus a sealing/closure of the at least one access channel 18 as soon as the outer side 20b of the membrane (or covering layer) of the respective membrane 20 is wetted at least with the minimum quantity of liquid. It is thus possible to define the minimum quantity of liquid by way of a design of the at least one membrane 20. The at least one membrane 20 is preferably also designed so as to deform back into its initial position as soon as less than the minimum quantity of liquid is present on the respective outer side 20b of the membrane (or covering layer) or as soon as the respective outer side 20b of the membrane (or covering layer) is again in an unwetted state.

The at least one membrane 20 may be designed in particular as having a relatively large-area outer side 20b so that a wetting of the respective outer side 20b of the membrane (or covering layer) with liquid/water causes a relatively large force for deforming the respective membrane 20. The at least one contact surface 22 (on the respective inner side 20a of the membrane) and the at least one associate membrane contact surface 24 (on the at least one associated access channel 18) are preferably of a comparatively small surface area (e.g. with a surface area of the at least one contact surface 22 or the at least one membrane contact surface 24 markedly below a surface area of the at least one associated outer side 20b of the membrane). In this case, the force produced by the wetting of the respective outer side 20b of the membrane (or covering layer) with at least the minimum quantity of liquid generates a comparatively high pressure, by which the associated sealing surfaces 22 and 24 are pressed against each other or closed. When the at least one outer side 20b of the membrane is developed over a relatively large area and the sealing surfaces 22 and 24 are developed over a comparatively small area, this makes it possible to deform even relatively stiff membranes 20 and/or to close comparatively large clearances a between sealing surfaces 22 and 24. A comparatively stiff development of the at least one membrane 20 and/or a relatively large clearance a between the sealing surfaces 22 and 24 produce in the deformation of the respective membrane 20 a relatively large return force so as to prevent an "adhesion" of the at least one deformed membrane 20.

In the specific embodiment shown schematically in FIG. 1, the at least one membrane 20 respectively has at least one air and/or gas exchange opening 26 that extends from the respective inner side 20a of the membrane to the respective outer side 20b of the membrane. The at least one air and/or gas exchange opening 26 may also be referred to as at least one segment of the at least one access channel 18 that extends through the at least one membrane 20. The at least one contact surface 22 rests on at least one water-impermeable sealing ring 28, which is developed on the respective inner side 20a of the membrane and which frames the respective associated air and/or gas exchange opening 26. The at least one air and/or gas exchange opening 26 and the sealing ring 28 that frames it are developed centrally in the respective membrane 20. The at least one sealing ring 28 is pressed against the at least one associated membrane contact surface 24 when the respective outer side 20b of the membrane (or covering layer) is wetted with at least the minimum quantity of liquid and the respective membrane 20 is deformed. The at least one sealing ring 28 thereby effects a reliable seal of the at least one associated air and/or gas exchange opening 26 that is impermeable to liquid/impermeable to water.

By way of example, in the sensor and/or sound detection device of FIG. 1, sensing device 10 is developed on and/or in a sensor substrate 30, while the at least one membrane 20 is developed on an outer side of cap substrate 32. The at least one membrane 20 spans at least one outer-side edge region of at least one channel 34 extending from the outer side to an inner side of cap substrate 32 facing away from the outer side. Cap substrate 32 is connected to sensor substrate 30 via an air-impermeable and water-impermeable connecting mass 36 in such a way that at least one inner-side edge region of the at least one channel 34 and the sensitive surface 12 border an intermediate volume 38 enclosed by the cap substrate 32, sensor substrate 30, and the air-impermeable and water-impermeable connecting mass 36, and that the at least one access channel 18 runs through the intermediate volume 38 and the at least one channel 34. As explained in more detail below, such a specific embodiment of the sensor and/or sound detection device is relatively simple to manufacture.

As an optional development, the sensor and/or sound detection device shown schematically in FIG. 1 may also have the covering layer situated (directly or indirectly on/over the outer side 20b of the membrane. In particular, the covering layer may also be permeable to air and/or the at least one gas (transferable through the at least one access channel 18) and cover the at least one air and/or gas exchange opening 26 of the associated membrane 20. Alternatively or additionally, the covering layer may also be water-repellent. Optionally, it is also possible for the at least one access channel 18 to be coated at least partially with a water-repellent layer.

Figure 2:
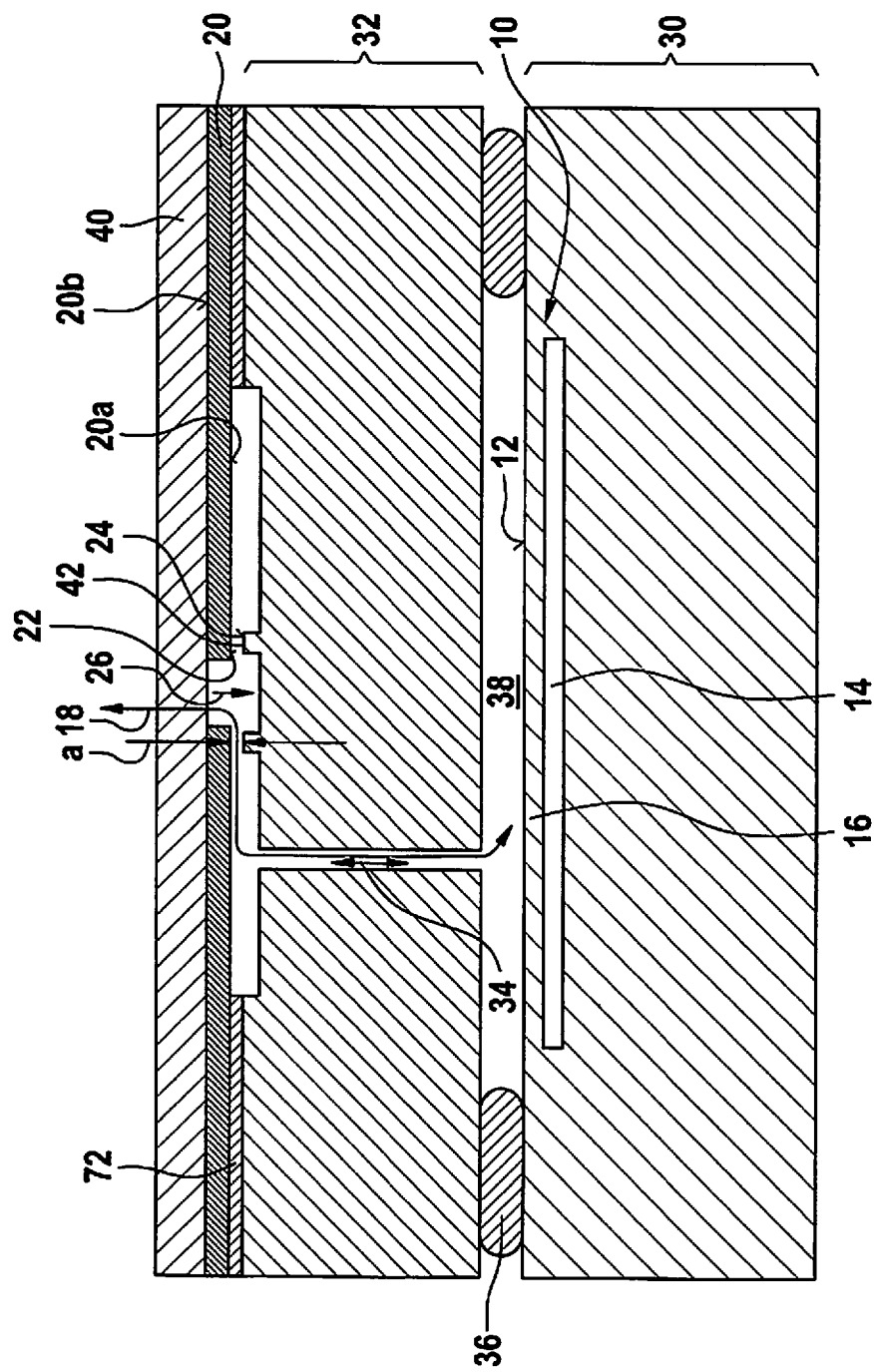
FIG. 2 shows a schematic representation of a second specific example embodiment of the sensor and/or sound detection device.

FIG. 2 shows a schematic representation of a second specific example embodiment of the sensor and/or sound detection device.

In contrast to the previously described specific example embodiment, the sensor and/or sound detection device shown schematically in FIG. 2 has the covering layer 40 on the respective outer side 20b of its at least one membrane 20. By way of example, the respective covering layer 40 is situated directly on the associated outer side 20b of the membrane. Alternatively, however, it is also possible for at least one intermediate layer to be situated between the outer side 20b of the membrane and the respectively associated covering layer 40.

In the specific embodiment of FIG. 2, the covering layer 40 is permeable to air and/or the at least one gas (transferable through the at least one access channel 18). This makes it possible to cover the at least one air and/or gas exchange opening 26 of the associated membrane 20 unproblematically with the respective covering layer 40. The covering layer 40, which is permeable to air and/or the at least one gas, is typically also impermeable to liquid/water up to a certain water pressure. The at least one membrane 20 is therefore preferably developed in such a way that at the respective water pressure there is already a wetting of the respective covering layer 40 that is sufficient (for sealing the at least one access channel 18 in a liquid-tight/water-tight manner by the contact between sealing surfaces 22 and 24). The covering layer 40 that is permeable to air and/or the at least one gas may be a Gore-Tex film, for example.

Alternatively or additionally to the covering layer 40 being permeable to air and/or the at least one gas, covering layer 40 may also be water-repellent. (If the water-repellent covering layer 40 is impermeable to air and/or the at least one gas, however, it is preferred that the at least one air and/or gas exchange opening 26 is kept clear.) The use of a water-repellent covering layer 40 prevents the at least one membrane 20 from being wetted with liquid/water and thus prevents an ingress of liquid/water through the at least one formed access channel 18. Moreover, the water-repellent covering layer results in a quicker pressure build-up when coming in contact with a liquid film/water film, and thus in an earlier sealing/closure of the at least one access channel 18. Optionally, it is also possible for the at least one access channel 18 to be coated at least partially with a water-repellent layer.

In the sensor and/or sound detection device of FIG. 2, the at least one membrane contact surface 24 is situated on at least one annular projection 42, against which the at least one associated contact surface 22, which frames its respective associated air and/or gas exchange opening 26, is pressed as the respective membrane 20 is deformed when the respective covering layer 40 (or outer side 20b of the membrane) is wetted with at least the minimum quantity of liquid. Additionally, the at least one contact surface 22 may be developed on a water-impermeable sealing ring 28 in order to ensure that the at least one membrane 20 rests only on precisely defined points even when its covering layer 40 (or outer side 20b of the membrane) is strongly wetted and may therefore be released again easily and be deformed back into its initial shape.

Regarding further features of the sensor and/or sound detection device of FIG. 2, reference is made to the previously described specific embodiment.

FIG. 3 shows a schematic representation of a third specific example embodiment of the sensor and/or sound detection device.

The sensor and/or sound detection device of FIG. 3 is mounted (e.g., using an adhesive 44) on an application-specific integrated circuit (ASIC) 46 and is packaged in a housing made up of a circuit board 48 and a plastic mass 50, into which the sensor and/or sound detection device is molded. An opening is formed in plastic mass 50 (for example by a film-mold process) above the at least one membrane 20.

Regarding further features of the sensor and/or sound detection device of FIG. 3, reference is made to the previously described specific embodiment.

The features of the sensor and/or sound detection devices described above may accordingly also exist in a chemical detection sensor, a humidity sensor, a gas sensor and/or a microphone.

FIGS. 4a through 4d show schematic representations for explaining a first specific example embodiment of the manufacturing method for a sensor and/or sound detection device.

In the manufacturing method described below, first a first sacrificial layer 60, preferably an oxide layer/silicon oxide layer, is applied on a (later) outer side of a cap wafer/cap substrate 32 and is patterned. Subsequently, a second sacrificial layer 62, for example another oxide layer/silicon oxide layer is deposited on the first sacrificial layer 60 and on uncovered remaining surfaces of the outer side of cap wafer/cap substrate 32 and is patterned. As an alternative to the use of the two sacrificial layers 60 and 62, it is possible to use in the implementation of the manufacturing method described here also a single sacrificial layer having a varying layer thickness. Subsequently, the at least one membrane 20, which covers the two sacrificial layers 60 and 62 (or the sole sacrificial layer), is formed. As may be seen in FIG. 4a, a shape and a layer thickness of the first sacrificial layer 60 define an "imprint" and a height of a sealing ring 28 formed on the respective inner side 20a of the at least one membrane 20, while a shape and a layer thickness of the second sacrificial layer 62 define a position and a clearance a of a (later) gap between at least one contact surface 22 and at least one associated membrane contact surface 24.

Additionally, prior to a formation of sacrificial layers 60 and 62 (or the sole sacrificial layer), it is possible to pattern/etch in a (later) area of the at least one membrane 20 a depression into the outer side of cap wafer/cap substrate 32 in order to prevent a protrusion of the at least one membrane 20 during further processing and to protect it additionally in its application.

Figure 4A:
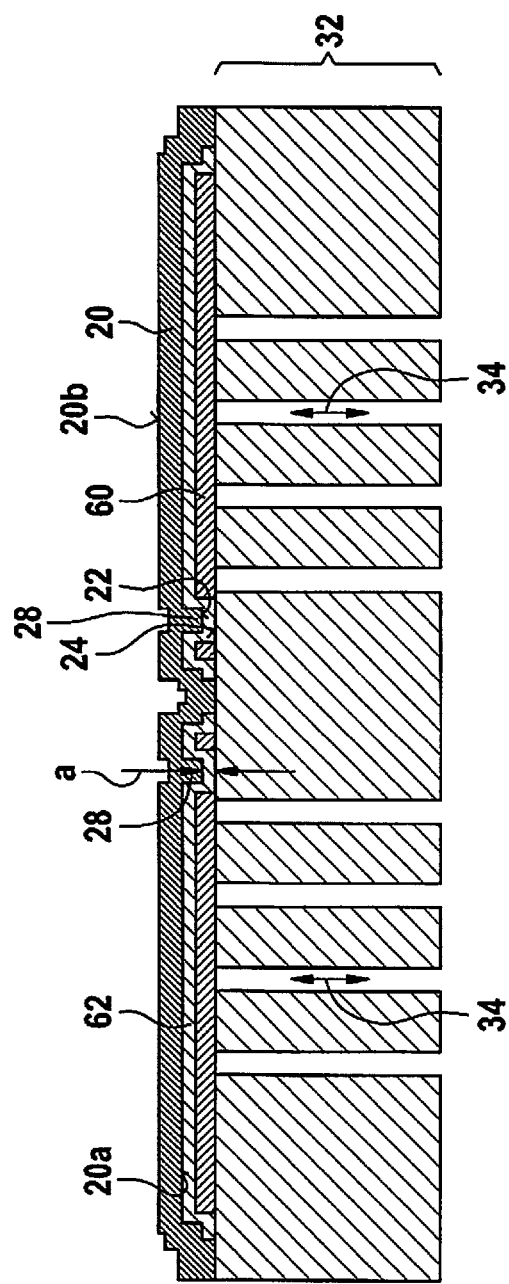
FIGS. 4a through 4d show schematic representations for explaining a first specific example embodiment of the manufacturing method for a sensor and/or sound detection device.

Furthermore, at least one channel 34 is structured/etched from the outer side of cap wafer/cap substrate 32 to an inner side of the cap wafer/cap substrate 22 facing away from the outer side. In this process, it is possible to use sacrificial layers 60 and 62 (or the sole sacrificial layer) as etch stop layers. Optionally, cap wafer/cap substrate 32 may subsequently be thinned, for example by a grinding process. The result is shown in FIG. 4a.

Figure 4B:
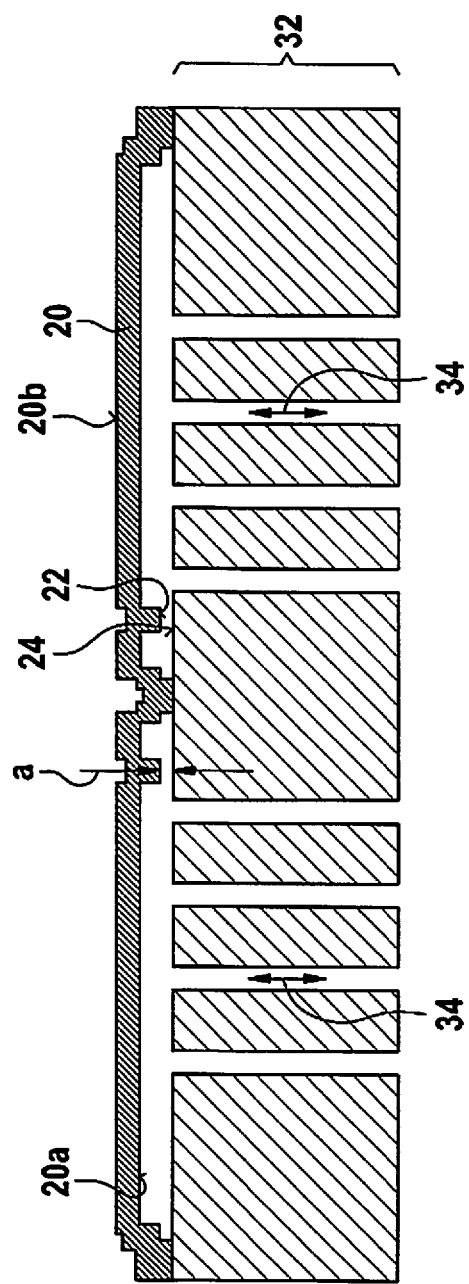

FIG. 4b shows the result of a sacrificial layer etching process for removing the two sacrificial layers 60 and 62 (or the sole sacrificial layer). The sacrificial layer etching method may be, for example, an etching method using hydrofluoric acid (HF).

Figure 4C:
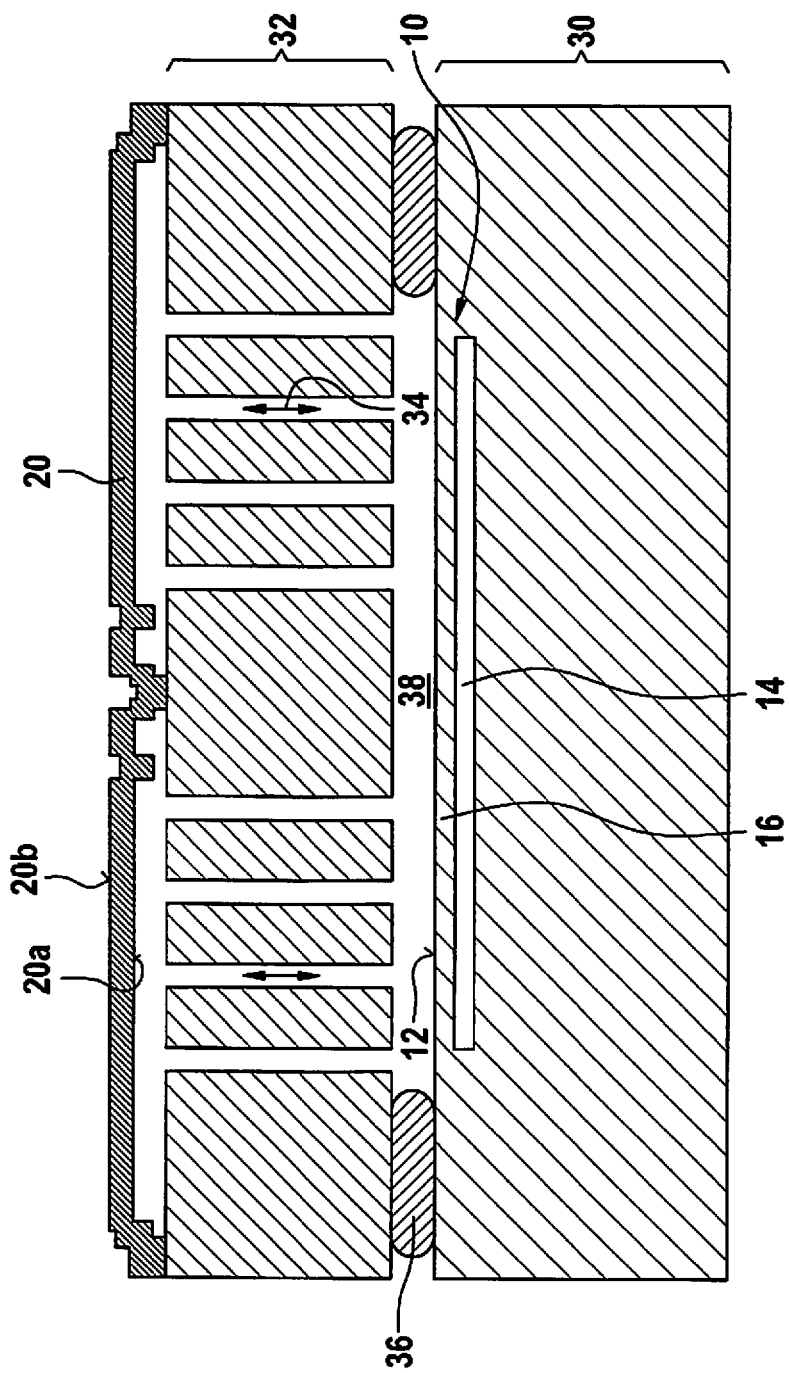

In the manufacturing method described here, a sensing device 10 is also developed with a sensitive surface 12 in such a way that a change of at least one physical variable and/or at least one chemical concentration on the sensitive surface 12 causes a change in a sensor signal output by sensing device 10 or tapped on sensor device 10. (FIG. 4c shows a sensor substrate 30 having sensor device 10.) The cap substrate 32 is fastened on sensor substrate 30 via an air-impermeable and/or water-impermeable connecting mass 36 in such a way that at least one inner-side edge region of the at least one channel 34 and the sensitive surface 12 border an intermediate volume 38 that is enclosed by cap substrate 32, sensor substrate 30 and the air-impermeable and water-impermeable connecting mass 36 and that the at least one (later) access channel 18 runs through intermediate volume 38 and the at least one channel 34. For example, the cap substrate 32 is bonded on sensor substrate 30, for example by a seal-glass breaking method or an eutectic bonding method. Alternatively, it is also possible to use an adhesive mass or a soldering mass as the air-impermeable and water-impermeable connecting mass 36. FIG. 4c shows the cap substrate 32 fastened on sensor substrate 30.

Figure 4D:
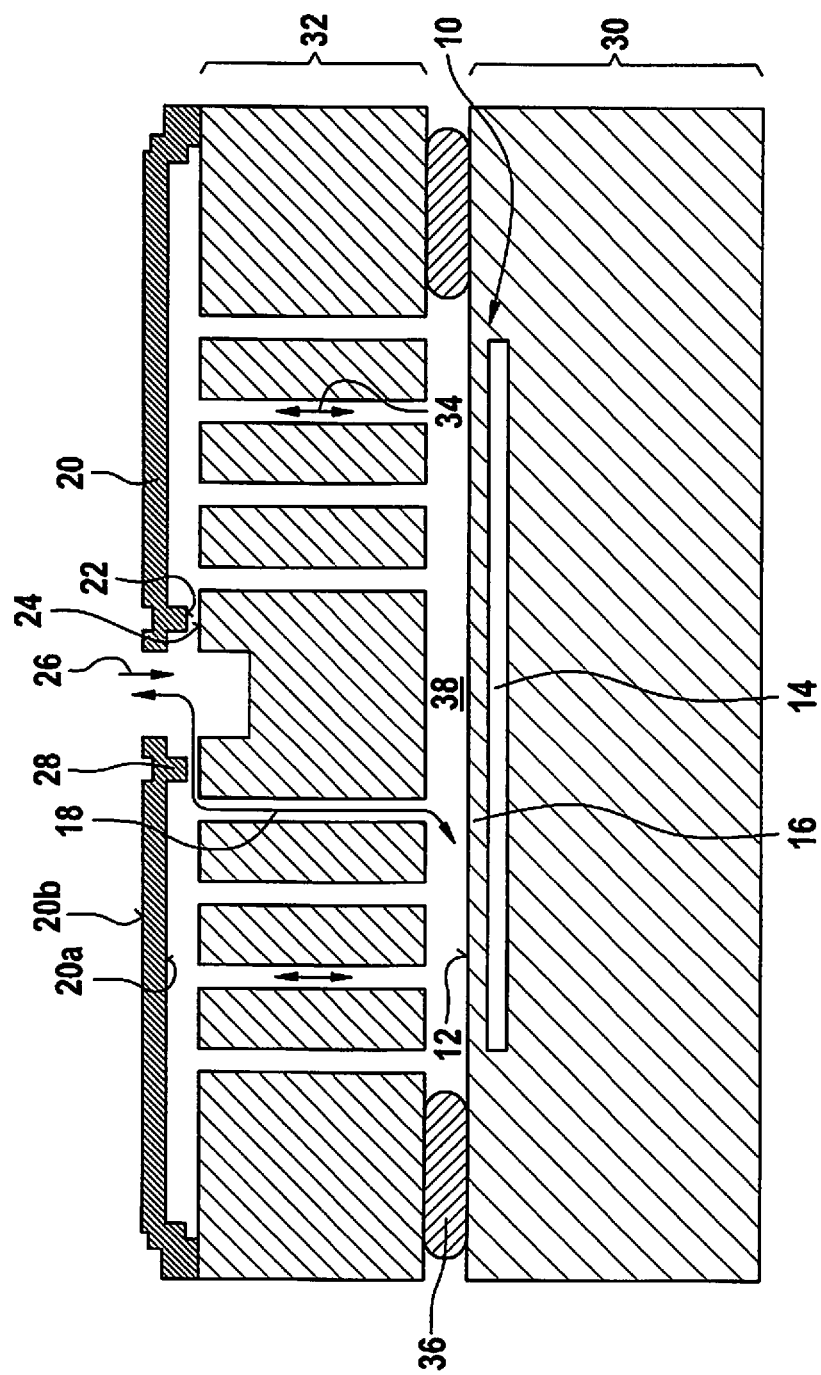

Finally, as shown schematically in FIG. 4d, the at least one air and/or gas exchange opening 26 is patterned (starting from the outer side 20b of the membrane) through the at least one membrane 20. Preferably, prior to this, the respective membrane 20 at a position of the at least one air and/or gas exchange opening 26 is still connected to cap substrate 32 so that the connection between the respective membrane 20 and cap substrate 32 is dissolved only by the patterning of the at least one air and/or gas exchange opening 26. This ensures that the at least one membrane 20 remains reinforced up to this step and thus protected for a long period. Optionally, subsequently, it is possible to deposit (directly or indirectly) a covering layer (not shown) on/above the respective outer side 20b of the at least one membrane 20.

Figure 5B:
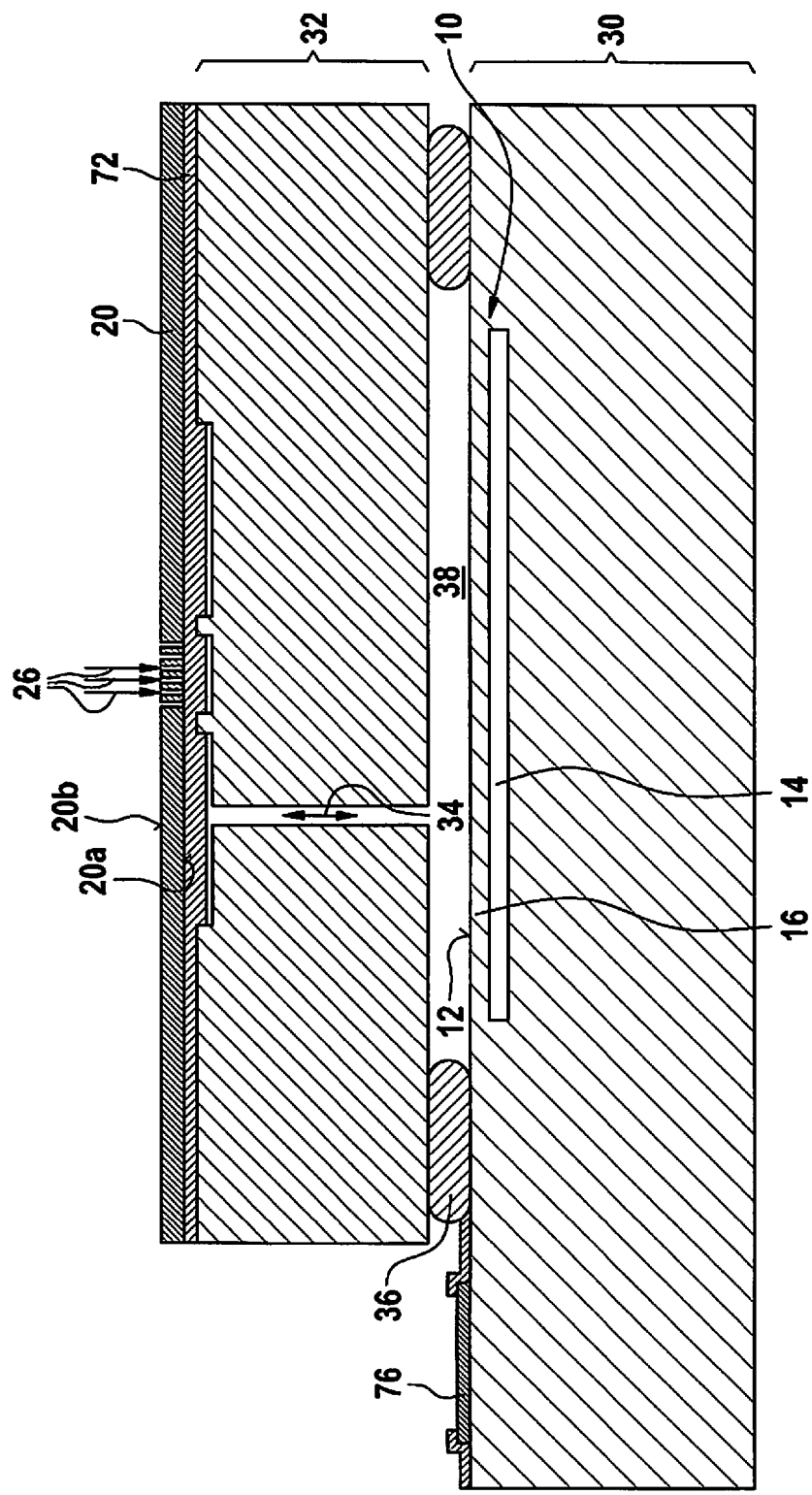
Figure 5C:
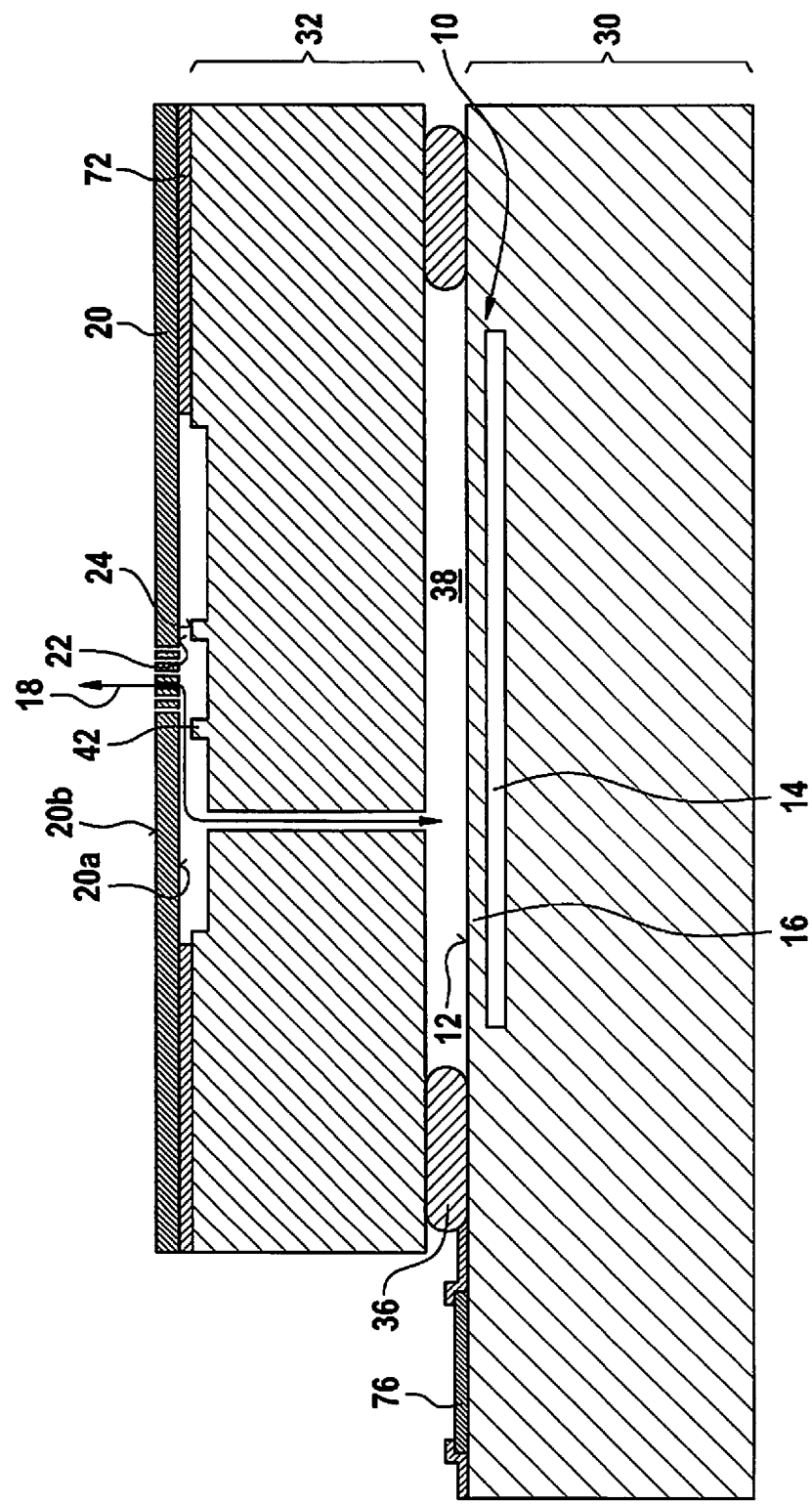

FIGS. 5a through 5c show schematic representations for explaining a second specific example embodiment of the manufacturing method.

When carrying out the method described here, first at least one trench 70, preferably at least one comparatively narrow trench 70 that leads from a future center of the membrane toward the outside, is patterned/etched into an outer side of a cap wafer/cap substrate 32. By interrupting the at least one trench 70, it is possible to define at least one later annular projection 42. The at least one trench 70 is filled (at least partially) with a sacrificial layer 72, such as for example an oxide layer/silicon oxide layer, in such a way that also remaining areas on the outer side of cap wafer/cap substrate 32 are covered as well. Preferably, at least one intermediate cavity 74 remains between a bottom surface of the at least one trench 70 and the sacrificial layer 72. Subsequently, the at least one membrane 20 is deposited on sacrificial layer 72.

In another method step, the at least one air and/or gas exchange opening 26 may be patterned through the at least one membrane 20. For example, it is possible to etch multiple air and/or gas exchange openings 26 (preferably having a maximum diameter below 5 μm) through the at least one membrane 20. At least one channel 34 is subsequently patterned/etched through the cap wafer/the cap substrate 32, it being possible to use sacrificial layer 72 as an etch stop layer. A thickness of cap wafer/cap substrate 32 may be reduced (for example by a grinding process). The result is shown in FIG. 5a.

Subsequently, cap substrate 32 is fastened on a sensor substrate 30 (having sensing device 10) via an air-impermeable and/or water-impermeable connecting mass 36. A contact area 76 on sensor substrate 30 may be exposed by removing a segment of cap substrate 32, for example by a sawing method, an etching method or a trench method. FIG. 5b shows the result.

As shown in FIG. 5c, sacrificial layer 72 is thereupon (partially) removed using a sacrificial layer etching method, for example by an etching method using hydrofluoric acid (HF), whereby the at least one membrane 20 is exposed and activated. The at least one membrane 20 thus remains protected for a comparatively long period. Optionally, it is then possible additionally to apply a covering layer directly or indirectly on the at least one outer side 20b of the membrane.

All of the manufacturing methods described above produce a formation of at least one access channel 18 in the respective sensor and/or sound detection device in such a way that (at least as long as the at least one access channel 18 is open) air and/or at least one gas is transferred through the at least one access channel 18 between a spatial surroundings of the sensor and/or sound detection device and the respective sensitive surface 12. In addition, at least one at least partially water-impermeable membrane 20 having respectively one inner side 20a of the membrane facing the at least one associated access channel 18 is developed in such a way that, when an outer side 20b of the respective membrane 20 or a covering layer 40 on the respective outer side 20b of the membrane is wetted with at least a minimum quantity of liquid, as the respective membrane 20 is deformed, at least one contact surface 22 on the respective inner side 20a of the respective membrane 20 is pressed against at least one associated membrane contact surface 24 on the at least one associated access channel 18 in such a way that the at least one associated access channel 18 is sealed in a liquid-tight manner.

It is explicitly noted that the above-described manufacturing methods may be implemented as wafer-level manufacturing methods. For example, sensing device 10 may be developed multiple times on and/or in a sensor wafer, and the sensor wafer may be divided into a plurality of sensor substrates 30 (respectively having the sensing device 10 and the sensitive surface 12). It is also possible to develop the at least one membrane 20 multiple times on an outer side of a cap wafer with continuous channels 34, and the cap wafer may be divided into a plurality of cap substrates 32 (respectively having the at least one membrane 20 on an outer side of the cap substrate 32, which respectively spans at least one outer-side edge region of at least of one channel 34 extending from the outer side to an inner side of cap substrate 32 that is facing away from the outer side). In this manner, it is possible to manufacture a plurality of sensor and/or sound detection devices simultaneously and more cost-effectively.

What is claimed is:

1. A sensor and/or sound detection device, comprising:
    a sensing device having a sensitive surface, which is designed in such a way that a change of at least one of: (i) at least one physical variable, and (ii) at least one chemical concentration, causes a change in a sensor signal one of: (i) output by the sensing device, or (ii) tapped on the sensing device;
    an access channel in the sensor and/or sound detection device designed in such a way that, at least as long as the access channel is open, at least one of: (i) air, and (ii) at least one gas, is transferable through the access channel between a spatial surroundings of the sensor and/or sound detection device and the sensitive surface; and
    an at least partially water-impermeable membrane having an inner side facing the access channel, a contact surface on the inner side of the membrane being pressed against the membrane contact surface on the access channel in such a way that the associated access channel is sealed in a liquid-tight manner when one of: (i) an outer side of the membrane, or (ii) a covering layer on the outer side of the membrane, is wetted with at least a minimum quantity of liquid and the respective membrane is deformed.

2. The sensor and/or sound detection device as recited in claim 1, wherein the membrane is designed in such a way that, if the one of the outer side of the membrane or the covering layer is unwetted, the membrane is in its initial position and the access channel is kept open via at least one open gap between the contact surface of the membrane in its initial position and the membrane contact surface on the access channel.

3. The sensor and/or sound detection device as recited in claim 1, wherein the membrane has at least one of an air and a gas exchange opening extending from the inner side of the membrane to the outer side of the membrane.

4. The sensor and/or sound detection device as recited in claim 3, wherein the contact surface rests on a water-impermeable sealing ring that is developed on the inner side of the membrane and that frames the at least one of the air and the gas exchange opening, and wherein the sealing ring is pressed against the membrane contact surface when the outer side of the membrane or the covering layer is wetted with at least the minimum quantity of liquid and the membrane is deformed.

5. The sensor and/or sound detection device as recited in claim 3, wherein the membrane contact surface rests on an annular projection, against which the contact surface, which frames its at least one of air and gas exchange opening, is pressed when the outer side of the membrane or covering layer is wetted with at least the minimum quantity of liquid and the respective membrane is deformed.

6. The sensor and/or sound detection device as recited in claim 3, wherein the covering layer is permeable to the at least one of the air and the at least one gas, and covers the at least one air and the gas exchange opening of the membrane.

7. The sensor and/or sound detection device as recited in claim 1, wherein the covering layer is water-repellent.

8. The sensor and/or sound detection device as recited in claim 1, wherein the sensing device is developed at least one of on and in a sensor substrate, the membrane being developed on an outer side of a cap substrate and spanning at least an outer-side edge region of a channel extending from the outer side to an inner side of the cap substrate facing away from the outer side, and the cap substrate being connected to the sensor substrate via an air-impermeable and water-impermeable connecting mass in such a way that at least one inner-side edge region of the channel and the sensitive surface border on an intermediate volume enclosed by the cap substrate, the sensor substrate and the air-impermeable and water-impermeable connecting mass and the access channel runs at least through the intermediate volume and the channel.

9. The sensor and/or sound detection device as recited in claim 1, wherein the sensor and/or sound detection device is at least one of: a pressure sensor, a chemical detection sensor, a humidity sensor, a gas sensor, and a microphone.

10. A manufacturing method for a sensor and/or sound detection device, comprising:
  developing a sensing device having a sensitive surface in such a way that a change of at least one of: (i) at least one physical variable, and (ii) at least one chemical concentration, on the sensitive surface causes a change in a sensor signal one of (i) output by the sensing device, or (ii) tapped on the sensing device; and
  developing at least one access channel in the sensor and/or sound detection device in such a way that, at least as long as the at least one access channel is open, at least one of (i) air, and (ii) at least one gas, is transferred through the at least one access channel between a spatial surroundings of the sensor and/or sound detection device and the sensitive surface; and
  developing at least one at least partially water-impermeable membrane having respectively an inner side facing the at least one associated access channel in such a way that at least one contact surface on the respective inner side of the respective membrane is pressed against at least one associated membrane contact surface on the at least one associated access channel in such a way that the at least one associated access channel is sealed in a liquid-tight manner when one of: (i) an outer side of the respective membrane, or (ii) a covering layer situated on the outer side, is wetted with at least a minimum quantity of liquid and the respective membrane is deformed.

11. The manufacturing method as recited in claim 10, wherein the sensing device is developed multiple times at least one of on and in a sensor wafer, the sensor wafer being divided into at least one sensor substrate including the sensing device and the sensitive surface, the at least one membrane being developed multiple times on an outer side of a cap wafer with continuous channels, the cap wafer being divided into at least one cap substrate having the at least one membrane on an outer side of the cap substrate, which spans respectively at least one outer-side edge region of at least one channel extending from the outer side to an inner side of the cap substrate facing away from the outer side, and the cap substrate being connected to the sensor substrate via an air-impermeable and water-impermeable connecting mass in such a way that at least one inner-side edge region of the at least one channel and the sensitive surface border on an intermediate volume enclosed by the cap substrate, the sensor substrate and the air-impermeable and water-impermeable connecting mass and that the at least one access channel runs at least through the intermediate volume and the at least one channel.

* * * * *